A. G. STUEDEMAN.
CHAIN FEED RIP SAW MACHINE.
APPLICATION FILED AUG. 27, 1913.
1,248,748.
Patented Dec. 4, 1917.
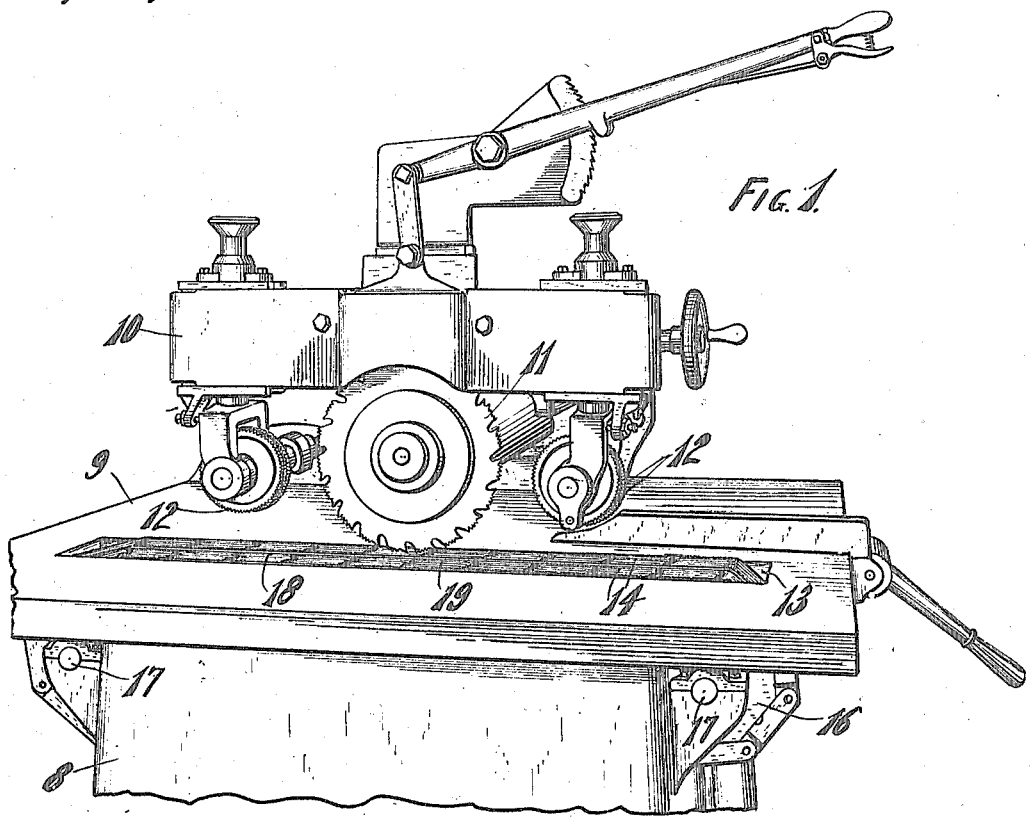
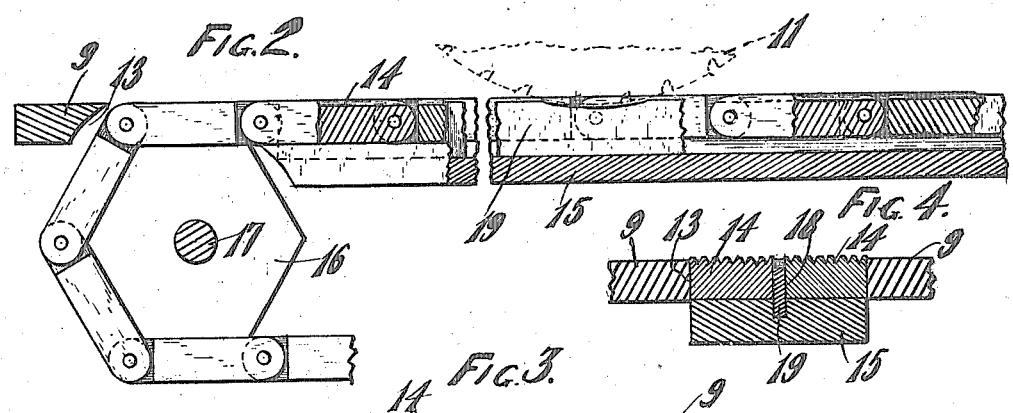
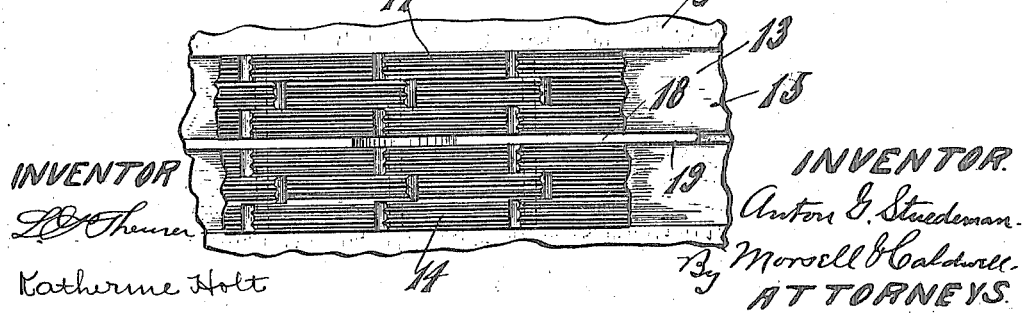

UNITED STATES PATENT OFFICE.

ANTON G. STUEDEMAN, OF SHEBOYGAN, WISCONSIN, ASSIGNOR TO FALLS MACHINE COMPANY, OF SHEBOYGAN FALLS, WISCONSIN, A CORPORATION OF WISCONSIN.

CHAIN-FEED RIP-SAW MACHINE.

1,248,748. Specification of Letters Patent. Patented Dec. 4, 1917.

Application filed August 27, 1913. Serial No. 786,827.

*To all whom it may concern:*

Be it known that I, ANTON G. STUEDEMAN, a citizen of the United States, and resident of Sheboygan, in the county of Sheboygan and State of Wisconsin, have invented new and useful Improvements in Chain-Feed Rip-Saw Machines, of which the following is a description, reference being had to the accompanying drawings, which are a part of this specification.

This invention relates to improvements in chain feed rip saw machines.

In the sawing machine art it is the present practice in some cases to position the feed chain on one side of the saw, and in other cases to mount a single chain medially of the saw and provide a groove in the chain to permit the saw to cut through the lumber resting on the chain and being cut. In the former case the feed is not in a straight line as the downward pressure of the saw tends to bind one side of the board on the table and retards the same to a considerable extent. In the other case in which the chain is grooved longitudinally, the groove permits portions of the board to be forced therein, and in sawing narrow stock the work is often spoiled in this manner.

It is one of the objects of the present invention to overcome the before mentioned objectionable features and provide a chain feed rip saw machine in which a firm foundation is provided for the lumber being sawed which moves with the lumber on both sides of the saw.

A further object of the invention is to provide a chain feed rip saw machine in which a pair of endless chains spaced apart to permit a saw to extend therebetween are adapted to feed and support the lumber being cut on both sides of the saw.

A further object of the invention is to provide a chain feed rip saw machine in which the feed chains are guided in spaced relation and prevented from moving laterally.

With the above and other objects in view, the invention consists of the improved chain feed rip saw machine and its parts and combinations as set forth in the claims, and all equivalents thereof.

In the accompanying drawing in which the same reference characters indicate the same parts in all of the views:

Figure 1 is a perspective view of the upper portion of the improved chain feed rip saw machine;

Fig. 2 is a detail view on a larger scale of the chain feed portion of the machine;

Fig. 3 is a fragmentary top view of the chain and table; and

Fig. 4 is a transverse sectional detail view of the chain and a portion of the table.

Referring to the drawing the numeral 8 indicates the frame, 9 the feed table, 10 the adjustable saw frame mounted above the table, 11 the saw and 12 the pressure feed rolls of the improved chain feed rip saw. The feed table 9 is provided with a longitudinally extending slot 13 to receive the pair of endless chains 14 which pass longitudinally therethrough. The chains are supported on the bed plate 15 of the table and the said plate is positioned a sufficient distance below the upper face of the table to position the upper faces of the chains a slight distance above the table in order to engage the lumber being cut.

The chains are spaced apart to accommodate the saw and are mounted on chain wheels 16 which in turn are mounted on shafts 17 one of which is driven to rotate both chains at the same rate of speed.

The feed rolls are positioned in the front and in the rear of the saw and are adapted to bear on the boards immediately above the feed chains and co-act therewith in feeding the boards.

In order to guide and space the two chains apart and to also prevent the feed rolls from forcing the strips of lumber into the saw space 18 between the chains a guide strip 19 is provided which is interposed between the chains and is mounted on the frame. The upper face of this strip is positioned just below the upper faces of the upper portions of the chains and at a point immediately below the saw the guide strip is provided with a curved recess 20 to accommodate the saw.

The working faces 21 of the chains are ribbed or grooved longitudinally to more firmly engage the boards.

From the foregoing description it will be seen that boards ripped on this machine will be firmly supported on both sides and in the front and rear of the saw while being cut and that as the feed is provided on both sides of the saw the boards will feed in a straight line.

What I claim as my invention is:

1. A rip saw machine, comprising a frame having a revoluble circular saw mounted thereon, feed rolls mounted on the frame, a pair of endless chains mounted on the frame below the saw and co-acting with the feed rolls for feeding material to the saw, said chains being spaced apart and traveling on opposite sides of the saw and moving at the same rate of speed, and a stationary guide strip interposed between the two chains in the plane of the saw and at approximately the level of the chains.

2. A rip saw machine, comprising a frame having a revoluble circular saw mounted thereon, feed rolls mounted on the frame, a pair of endless chains mounted on the frame below the saw and co-acting with the feed rolls for feeding material to the saw, said chains being spaced apart and traveling on opposites ides of the saw and moving at the same rate of speed, and a stationary guide strip interposed between the two chains with its upper surface positioned a short distance below the upper surfaces of the upper portions of the chains and having a recessed portion to accommodate the saw.

3. A rip saw machine, comprising a frame having a slotted table portion, a circular saw mounted above the table and extending into the slot, feed rolls mounted on the frame above the slotted portion, a pair of endless chains mounted on the frame and co-acting with the feed rolls for feeding material to the saw, said chains being spaced apart and extending into the slotted portion of the table and guided by the edge walls thereof, and a stationary guide strip interposed between the two chains with its upper surface positioned a short distance below the upper surfaces of the upper portions of the chains and having a recessed portion below the saw.

In testimony whereof, I affix my signature, in presence of two witnesses.

ANTON G. STUEDEMAN.

Witnesses:
H. A. LANDWEHR,
JOS. M. THOISON.

Copies of this patent may be obtained for five cents each, by addressing the "Commissioner of Patents, Washington, D. C."